United States Patent
Cai et al.

(10) Patent No.: US 12,434,039 B2
(45) Date of Patent: Oct. 7, 2025

(54) FLOW REGULATING SHUNT VALVE

(71) Applicant: Medtronic PS Medical, Inc., Minneapolis, MN (US)

(72) Inventors: Yi Cai, Shanghai (CN); Steve Han, Irvine, CA (US); Yong Feng, Shanghai (CN); Zhihua Luo, Shanghai (CN); Jeff William Bertrand, Irvine, CA (US)

(73) Assignee: Medtronic PS Medical, Inc., Goleta, CA (US)

( * ) Notice: Subject to any disclaimer, the term of this patent is extended or adjusted under 35 U.S.C. 154(b) by 353 days.

(21) Appl. No.: 18/027,863

(22) PCT Filed: Oct. 28, 2020

(86) PCT No.: PCT/CN2020/124438
§ 371 (c)(1),
(2) Date: Mar. 22, 2023

(87) PCT Pub. No.: WO2022/087900
PCT Pub. Date: May 5, 2022

(65) Prior Publication Data
US 2023/0347120 A1 Nov. 2, 2023

(51) Int. Cl.
*A61M 27/00* (2006.01)
*A61M 5/142* (2006.01)
(Continued)

(52) U.S. Cl.
CPC ...... *A61M 27/006* (2013.01); *A61M 5/14244* (2013.01); *A61M 5/16881* (2013.01); *A61M 39/24* (2013.01)

(58) Field of Classification Search
CPC ............ A61M 17/006; A61M 5/14244; A61M 5/16881; A61M 39/24
(Continued)

(56) References Cited

U.S. PATENT DOCUMENTS 3,111,125 A * 11/1963 Schulte ............... A61M 27/006
604/9
3,595,240 A * 7/1971 Mishler ............... A61M 27/006
604/9
(Continued)

FOREIGN PATENT DOCUMENTS

CN     1950126 A  *  4/2007   ............ A61M 39/26
CN   107854771 A      3/2018
(Continued)

OTHER PUBLICATIONS

Extended European Search Report for related International Application No. PCT/CN2020/124438; Dated: Jul. 24, 2024; 9 pages.
(Continued)

*Primary Examiner* — Andrew J Mensh
(74) *Attorney, Agent, or Firm* — Carter, DeLuca & Farrell LLP (57) ABSTRACT

A valve assembly (10) configured to maintain fluid flow therethrough at a constant flow rate. The valve assembly (10) including a flexible flow control member (50) defining an inner fluid chamber (90) within the flexible flow control member (50) and an inlet opening (56) to the inner fluid chamber (90). An outer fluid chamber (92) is defined between the flexible flow control member (50) and an inner surface (74) of a valve housing (20). The flexible flow control member (50) is configured to flex inward and shrink the inner fluid chamber (90) in response to a pressure decrease in the inner fluid chamber (90) relative to the outer
(Continued)

fluid chamber (92) resulting from an increase in an inlet flow rate to maintain an outlet flow rate from the valve assembly (10) at the constant flow rate.

20 Claims, 9 Drawing Sheets (51) Int. Cl.
*A61M 5/168* (2006.01)
*A61M 39/24* (2006.01)

(58) Field of Classification Search
USPC .............................................................. 604/9
See application file for complete search history.

(56) References Cited

U.S. PATENT DOCUMENTS

| | | | |
|---|---|---|---|
| 3,999,553 A | | 12/1976 | Spitz et al. |
| 4,267,835 A | * | 5/1981 | Barger ................ A61M 39/225 |
| | | | 604/250 |
| 4,552,553 A | * | 11/1985 | Schulte ............... A61M 27/006 |
| | | | 604/9 |
| 5,304,114 A | | 4/1994 | Cosman et al. |
| 5,662,600 A | * | 9/1997 | Watson ............. A61M 39/0208 |
| | | | 604/9 |
| 2002/0026139 A1 | | 2/2002 | Bertrand et al. |
| 2004/0082900 A1 | * | 4/2004 | Luttich ................ A61M 27/006 |
| | | | 604/9 |
| 2010/0056980 A1 | * | 3/2010 | Negre ................. A61M 27/006 |
| | | | 604/10 |
| 2019/0136991 A1 | | 5/2019 | Pennell | |

FOREIGN PATENT DOCUMENTS

| | | |
|---|---|---|
| CN | 107854773 A | 3/2018 |
| CN | 108721764 A | 11/2018 |
| CN | 111032143 A | 4/2020 |
| EP | 0276356 B1 | 4/1991 |
| EP | 0528977 B1 | 11/1995 |

OTHER PUBLICATIONS

International Search Report and Written Opinion regarding International Application No. PCT/CN2020/124438, dated Jul. 29, 2021; ISA/CN.

Chinese Office Action received by the Chinese Office Action for related Chinese Application No. 202080106418.4 dated Oct. 31, 2024, 10 pages.

* cited by examiner

FLOW REGULATING SHUNT VALVE

CROSS-REFERENCE TO RELATED APPLICATIONS

This application is a 371 U.S. National Phase of International Application No. PCT/CN2020/124438, filed Oct. 28, 2020. The entire disclosure of the above application is incorporated herein by reference.

FIELD

The present disclosure relates to flow regulating valve, such as a flow regulating shunt valve for managing hydrocephalus, for example.

BACKGROUND

This section provides background information related to the present disclosure, which is not necessarily prior art.

Management of hydrocephalus is commonly realized by diverting cerebrospinal fluids from intracranial ventricles into peritoneal cavities. Fluid flow is managed by a valve, which provides a flow rate that is not constant. While current valves are suitable for their intended use, they are subject to improvement. The present disclosure advantageously includes an improved valve able to provide a constant flow rate, as explained in detail herein. One skilled in the art will appreciate that the present disclosure provides numerous additional advantages as well.

SUMMARY

This section provides a general summary of the disclosure, and is not a comprehensive disclosure of its full scope or all of its features.

The present disclosure includes a valve assembly configured to control fluid flow therethrough. The valve assembly has a housing, an inlet passageway through which fluid enters the housing at an inlet flow rate, and an outlet passageway through which fluid exits the housing at an outlet flow rate. A flexible flow control member is within the housing. The flexible flow control member defines an inner fluid chamber within the flexible flow control member and an inlet opening to the inner fluid chamber. The inlet passageway and the outlet passageway are in fluid communication with the inner fluid chamber. An outer fluid chamber is defined between the flexible flow control member and an inner surface of the housing. The valve assembly is configured such that fluid flows into the outer fluid chamber from the inlet passageway, from the outer fluid chamber into the inner fluid chamber through the inlet opening defined by the flexible flow control member, and out of the inner fluid chamber through the outlet passageway. The flexible flow control member is configured to flex inward and shrink the inner fluid chamber in response to a pressure decrease in the inner fluid chamber relative to the outer fluid chamber resulting from an increase in the inlet flow rate to maintain the outlet flow rate at a constant rate.

The present disclosure further includes a valve assembly configured to be arranged on a user to provide a constant flow rate of a fluid through the valve assembly into or out of the user. The valve assembly includes an inlet connector extending from an upstream end of a housing. The inlet connector is configured to connect to a first conduit delivering the fluid into the housing at an inlet flow rate. An outlet connector extends from a downstream end of the housing and is configured to connect to a second conduit carrying the fluid away from the housing at an outlet flow rate. A flexible flow control member is within the housing. The flexible flow control member defines an inner fluid chamber within the flexible flow control member and an inlet opening to the inner fluid chamber. A support is within the housing to which the flexible flow control member is mounted. The support defines an outlet opening to the outlet passageway. The outlet opening is within the inner fluid chamber. An outer fluid chamber is defined between the flexible flow control member and an inner surface of the housing. A check valve is at an upstream end of the housing and is configured to allow flow of the fluid from the inlet connector into the outer fluid chamber and restrict flow of the fluid from the outer fluid chamber back into the inlet connector. The valve assembly is configured such that from the outer fluid chamber the fluid flows into the inner fluid chamber through the inlet opening defined by the flexible flow control member, and out of the inner fluid chamber through the outlet opening and the outlet passageway. In response to an increase in negative static hydraulic pressure within the outlet passageway, the flexible flow control member is configured to flex towards the outlet opening to reduce flow of the fluid through the outlet opening and maintain the outlet flow rate at the constant flow rate.

The present disclosure also includes a method for using a valve assembly to provide a constant flow rate of fluid through the valve assembly into or out of a user. The method includes the following: connecting an inlet connector extending from an upstream end of a housing to a first conduit delivering the fluid into the housing at an inlet flow rate; connecting an outlet connector extending from a downstream end of the housing to a second conduit transporting the fluid out of the housing at an outlet flow rate; and arranging the valve assembly relative to the user. The valve assembly is configured such that the fluid flowing into the housing through the inlet connector flows into an outer fluid chamber surrounding a flexible flow control member, into an inner fluid chamber defined by the flexible control member through an inlet opening defined by the flexible flow control member, and out of the inner fluid chamber through an outlet opening and the outlet connector. In response to a reduction of inner pressure within the inner fluid chamber relative to the outer fluid chamber of the valve assembly resulting from an increase in the inlet flow rate of the fluid into the housing, the flexible flow control member is configured to flex inward and shrink the inner fluid chamber to provide the constant flow rate of the fluid through the valve assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2:
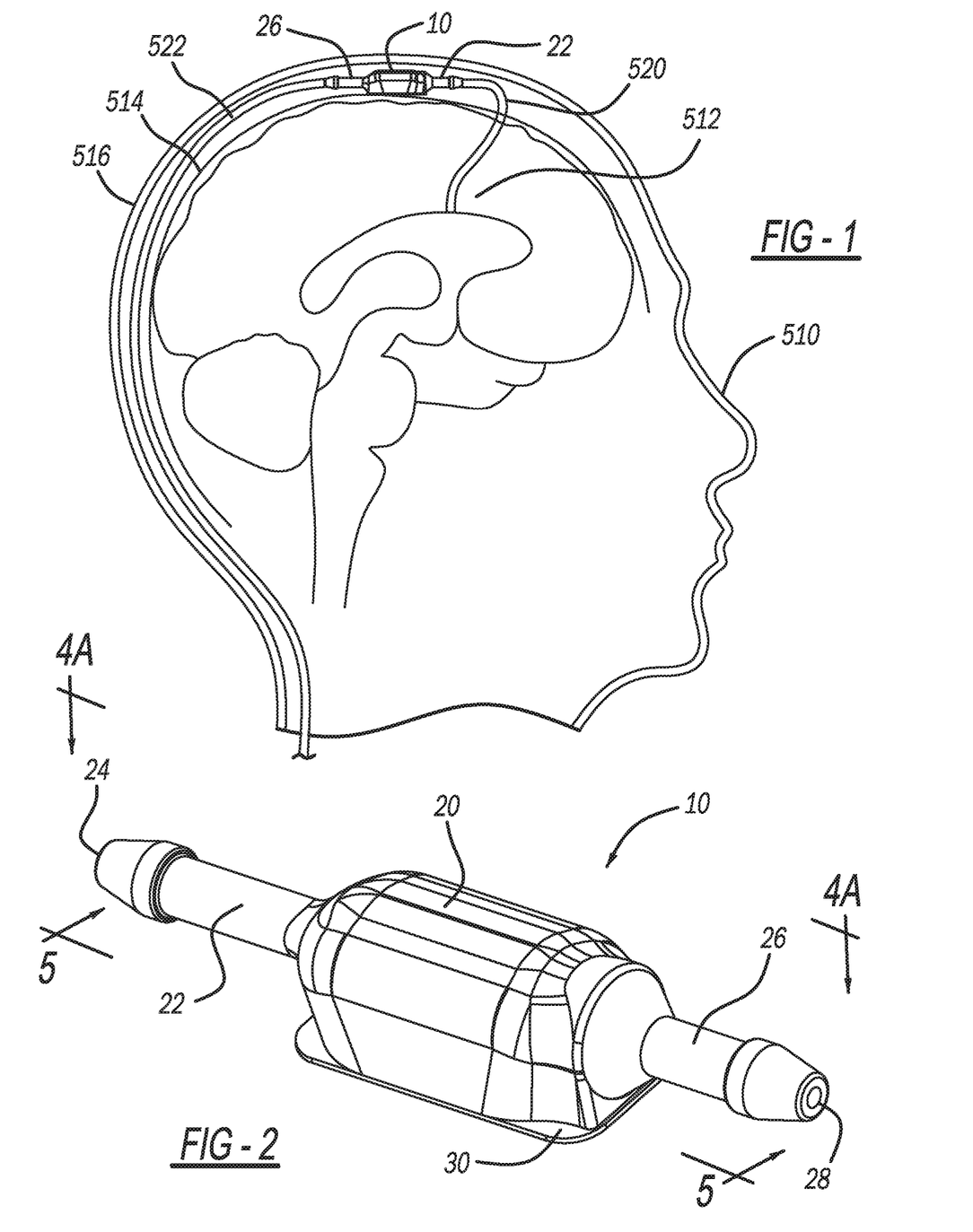
FIG. 1 illustrates an exemplary valve assembly in accordance with the present disclosure connected to a subject to regulate fluid flow from the subject.
FIG. 2 is a perspective view of the valve assembly of FIG. 1.
Figure 3:
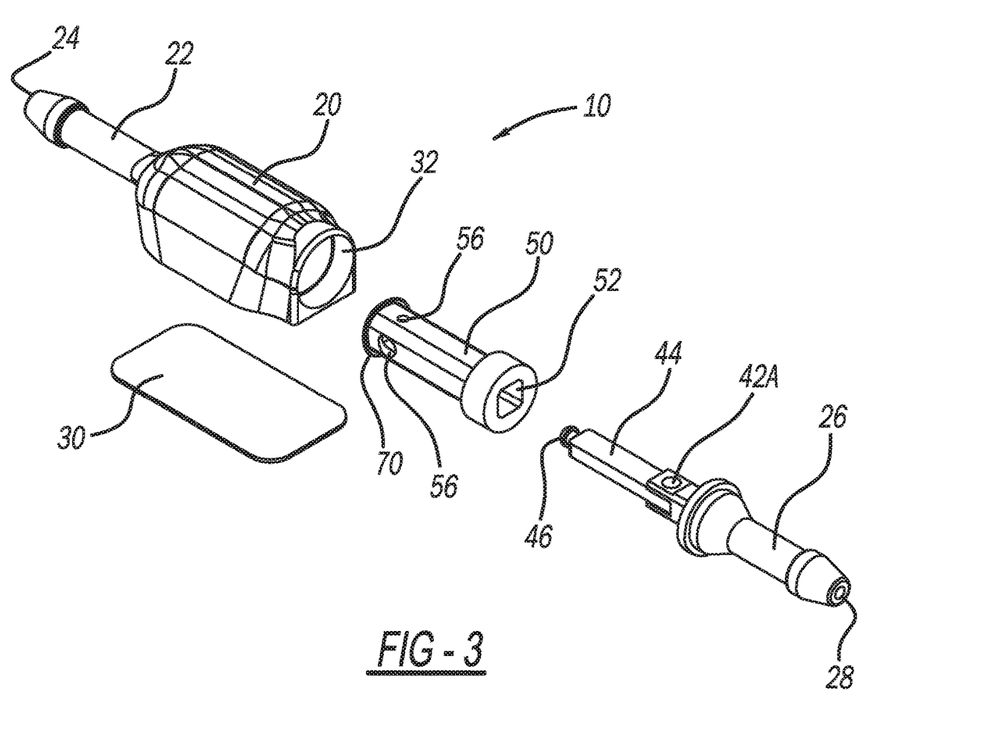
FIG. 3 is an exploded view of the valve assembly of FIG. 1.

With initial reference to FIGS. 1-3, a valve assembly in accordance with the present disclosure is illustrated at reference numeral 10. The valve assembly 10 advantageously regulates fluid flow therethrough to provide a constant flow regardless of pressure change experienced in the system that the valve assembly 10 is connected to, as explained in detail herein. The valve assembly 10 may be used in any suitable application where constant fluid flow is advantageous. For example, the valve assembly 10 may be used to provide constant fluid flow in treating idiopathic normal pressure hydrocephalus (iNPH), as well as during chemotherapy. Although the valve assembly 10 is discussed in the context of a hydrocephalus application, the valve assembly 10 may be used to control fluid in any other application with varying pressures and/or fluid flow, such as any suitable non-medical application.

Hydrocephalus is most common in infants and elders, and is typically caused by impeded cerebrospinal fluid (CSF) circulation due to trauma, tumor, congenital malformations, intracerebral hemorrhage, etc. Hydrocephalus often causes intracranial ventricle pressure increase, and patient symptoms typically include headache, nausea, drowsiness, poor balance, vision impairment, and/or motor function loss. Current shunting technology includes use of a differential-pressure valve that regulates, and is driven by, intracranial pressure. In contrast, the valve assembly 10 according to the present disclosure regulates excess fluid, such as excess CSF, by diverting fluid at a constant flow rate.

In the exemplary configuration of FIG. 1, the valve assembly 10 is attached to a subject 510 in order to drain fluid from a brain 512. The valve assembly 10 is arranged on a cranium 514 below a dermis 516 of the subject 510. The valve assembly 10 includes a housing or main body 20, which is between an inlet connector 22 and an outlet connector 26. The inlet connector 22 defines an inlet port 24. The outlet connector 26 defines an outlet port 28. Fluid enters the inlet port 24 at an inlet flow rate, and exits the outlet port 28 at an outlet flow rate. Advantageously, the valve assembly 10 is configured such that the outlet flow rate remains constant notwithstanding changes in the inlet flow rate and changes in pressure.

The inlet connector 22 is connected to a first conduit or catheter 520 extending from the brain 512. The outlet connector 26 is connected to a second conduit or catheter 522. The second conduit 522 extends to any suitable drain location. With respect to excess CSF, for example, it is shunted from intracranial ventricles to the peritoneal cavity or heart atriums, and is finally absorbed by the lymphatic system and/or blood circulation of the subject 510. Although the valve assembly 10 is illustrated as arranged on the cranium 54, the valve assembly 10 may be arranged at any other suitable location, such as behind an ear of the subject 510, on a bony skull plate of the subject 510, etc. Hence, the valve assembly 10 is advantageously miniaturized and has a very low profile due to, for example, having inline openings and an integrated regulating and opening mechanism.

A base sheet 30 may be included to facilitate placement of the valve assembly 10, such as at an exterior bone surface. The housing 20 may be secured to the base sheet 30 in any suitable manner, such as with any suitable adhesive. The base sheet 30 may be made of braided silicone, or any other suitable material. The housing 20 may be made of plastic or any other suitable material.

Figure 4A:
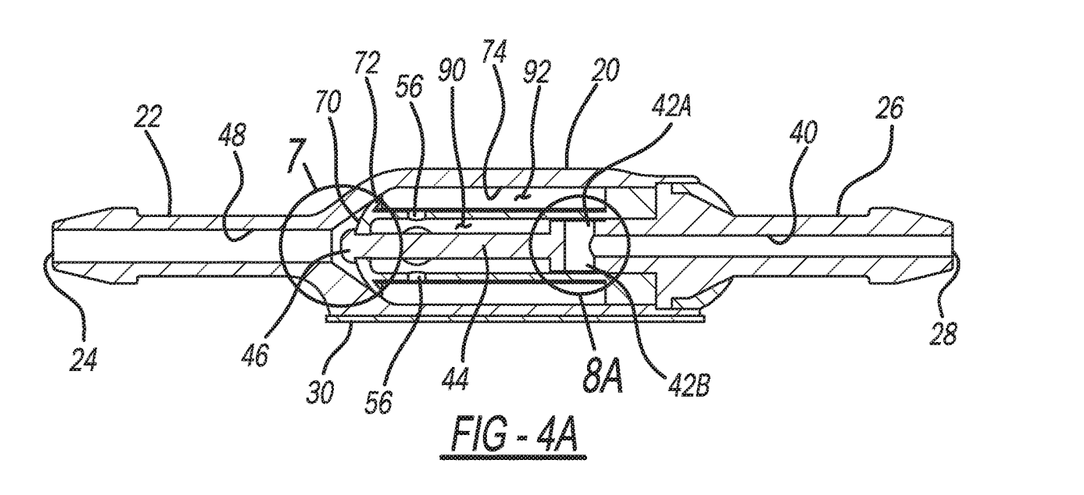
FIG. 4A is a cross-sectional view of the valve assembly taken along line 4A-4A of FIG. 2.

With continued reference to FIGS. 1-3, and additional reference to FIG. 4A, the outlet connector 26 defines an outlet passageway 40, which extends from the outlet port 28 into the housing 20. The outlet connector 26 is seated in a body outlet aperture 32 of the housing 20. The outlet passageway 40 extends from the outlet port 28, through the body outlet aperture 32, and into the housing 20.

A first outlet opening 42A and a second outlet opening 42B of the outlet passageway 40 are defined within the housing 20. Extending from the first and second outlet openings 42A and 42B is a support 44, which extends further into the housing 20 towards the inlet connector 22. At an end of the support 44 proximate to an inlet passageway 48 is a knob 46. The inlet connector 22 defines the inlet passageway 48, which extends from the inlet port 24 to the housing 20.

Seated on the support 44 is a flexible flow control member 50. In the example illustrated, the flexible flow control member 50 has a generally tubular configuration. The flexible flow control member 50 may be made of any suitable flexible material, such as silicone, polysiloxane, or any other suitable polymer. The flexible flow control member 50 may also made of any suitable rubber material, such as ethylene propylene diene monomer (EDPM) or Viton™, which is available from the Chemours Company of Wilmington, Delaware.

The flexible flow control member 50 defines an aperture 52 at a downstream end thereof, through which the outlet passageway 40 extends. Near an upstream end of the flexible flow control member 50 are one or more inlet openings 56. For example, the flexible flow control member 50 may define four inlet openings 56; a pair of inlet openings 56 on a top and bottom, and a pair of inlet openings 56 on opposite sides of the flexible flow control member 50. The top and bottom inlet openings 56 may be smaller than the side inlet openings 56.

The flexible flow control member 50 defines an inner fluid chamber 90 therein. An outer fluid chamber 92 is defined between the flexible flow control member 50 and the inner surface 74 of the housing 20. The inlet openings 56 provide fluid communication between the outer fluid chamber 92 and the inner fluid chamber 90.

Figure 4B:
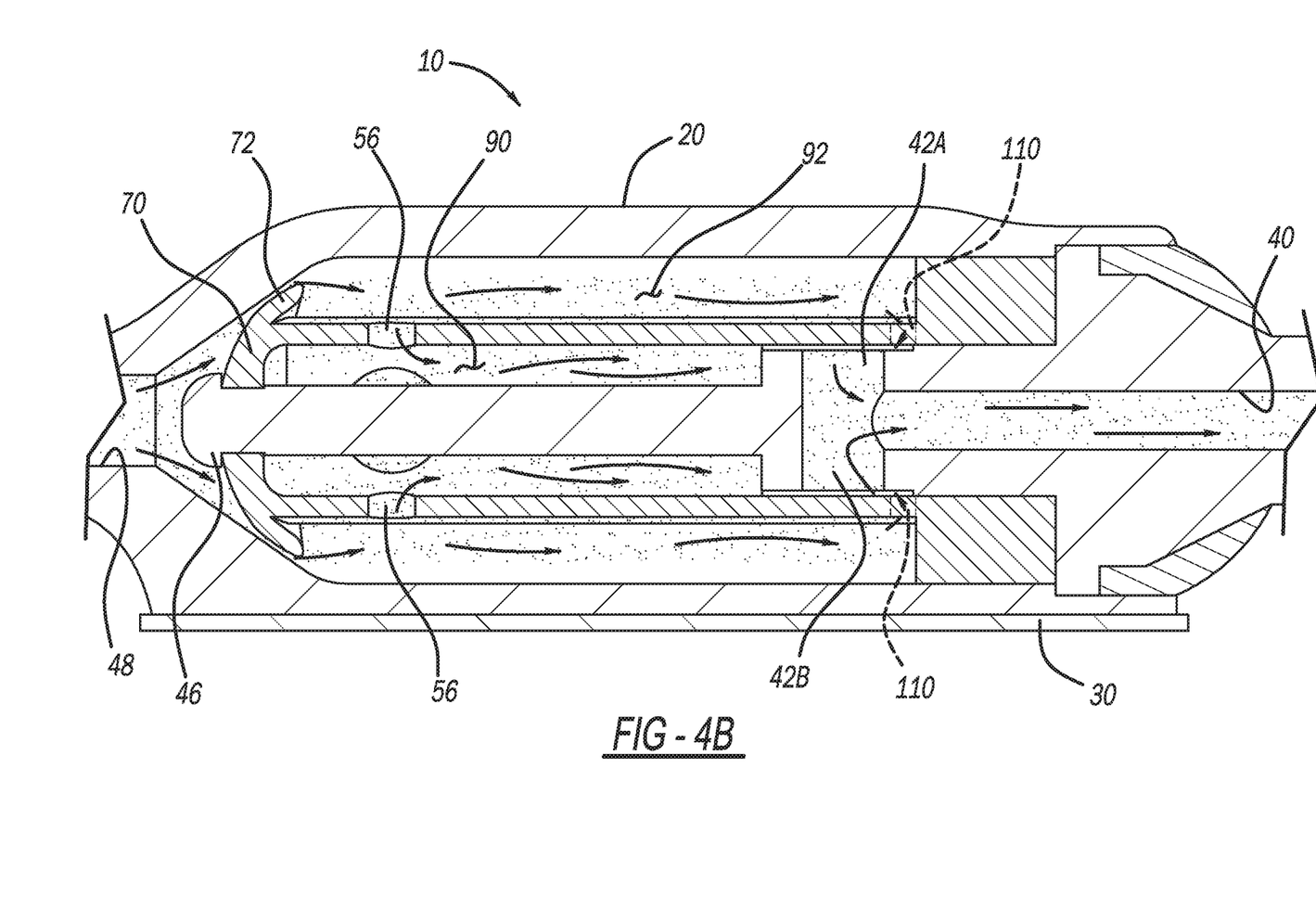
FIG. 4B illustrates fluid flow through the valve assembly at a first flow rate.
Figure 4C:
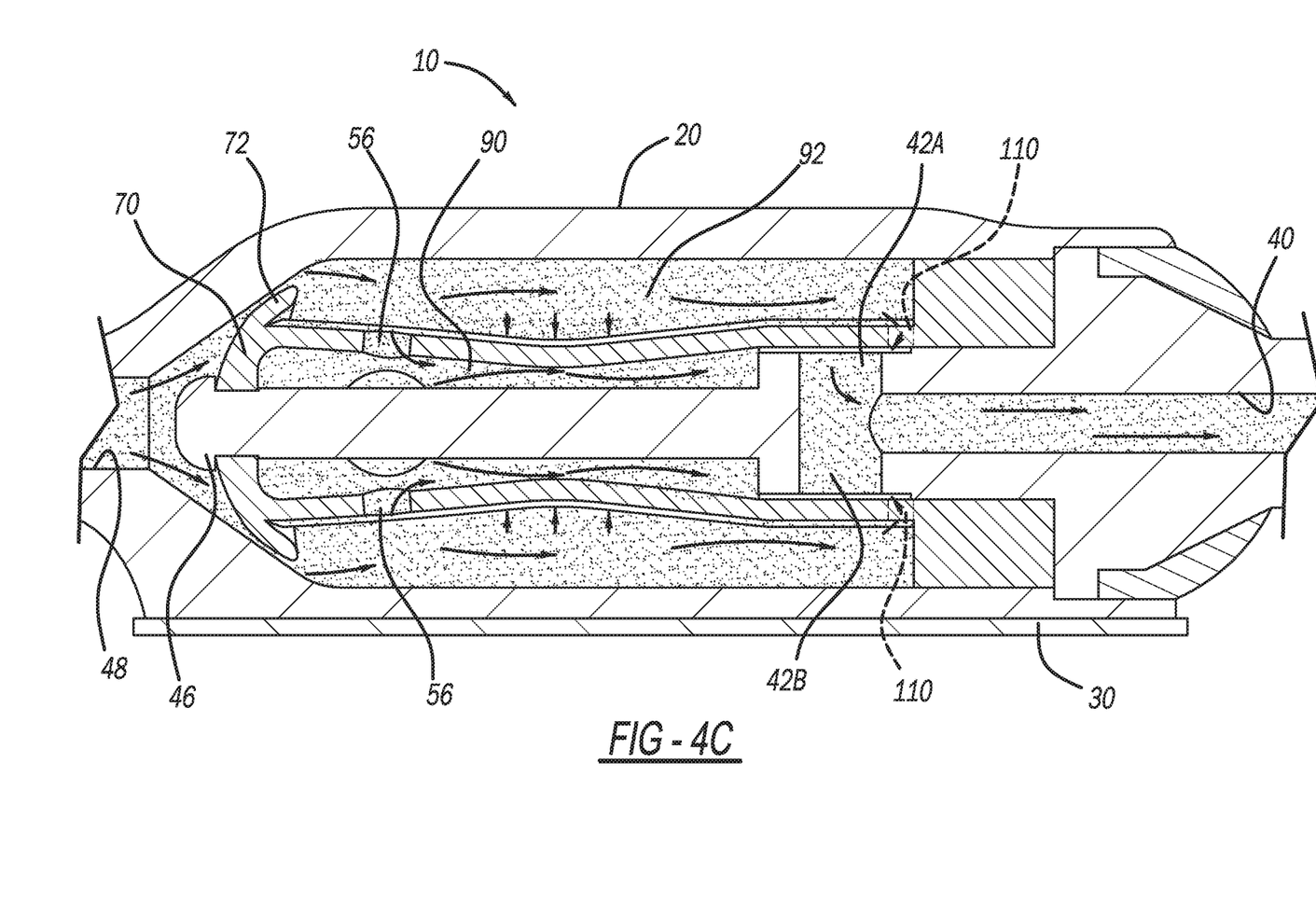
FIG. 4C illustrates fluid flow through the valve assembly at a second flow rate that is greater than the first flow rate.
Figure 7:
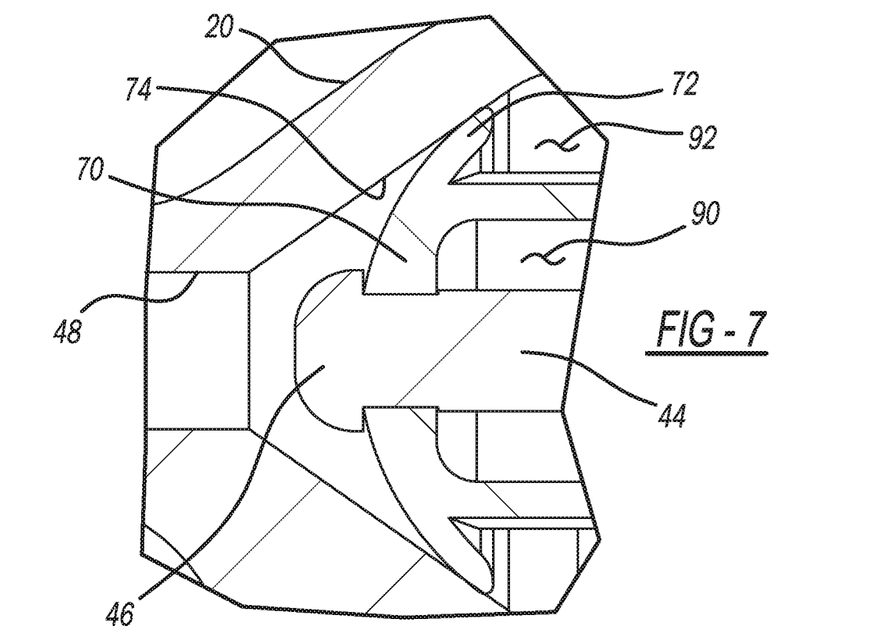
FIG. 7 illustrates area 7 of FIG. 4A in detail.

A check valve 70 is at an upstream end of the flexible flow control member 50. In the example illustrated, the check valve 70 includes a flexible flap 72, and is integral with a remainder of the flexible flow control member 50. The check valve 70 is seated on the support 44 at the knob 46 such that the flexible flap 72 abuts an inner surface 74 of the housing 20 proximate to the inlet passageway 48 when the flexible flap 72 is in a relaxed position. The flexible flap 72 is movable from the relaxed position to a flexed or folded position to allow fluid to flow across the check valve 70 from the inlet passageway 48 when the fluid is great enough to flex the flap 72. The flexible flap 72 restricts fluid flow in an opposite direction. FIGS. 4B and 4C illustrate exemplary fluid flow across the check valve 70 into the outer fluid chamber 92 and the inner fluid chamber 90, and will be described in detail herein. FIG. 7 illustrates area 7 of FIG. 4A in detail, and shows interaction between the flexible flap 72 of the check valve 70 and the inner surface 74 of the housing 20.

Figure 5:
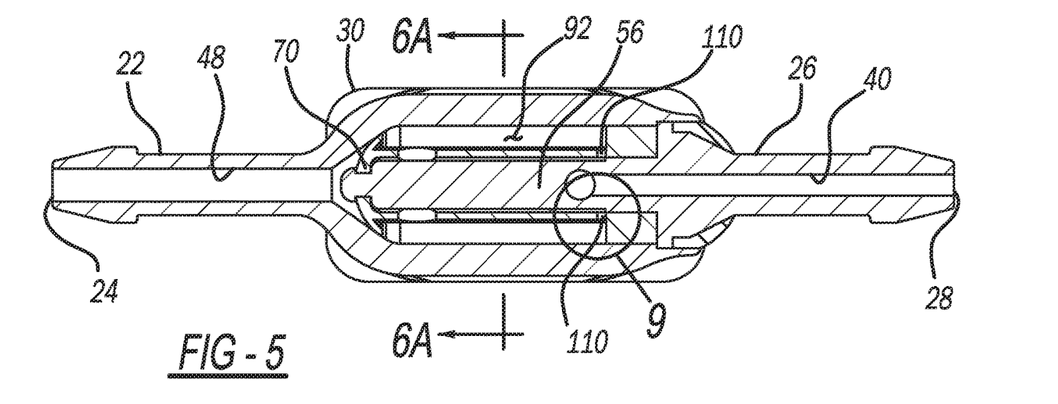
FIG. 5 is another cross-sectional view of the valve assembly taken along line 5-5 of FIG. 2.
Figures 6A, 6B:
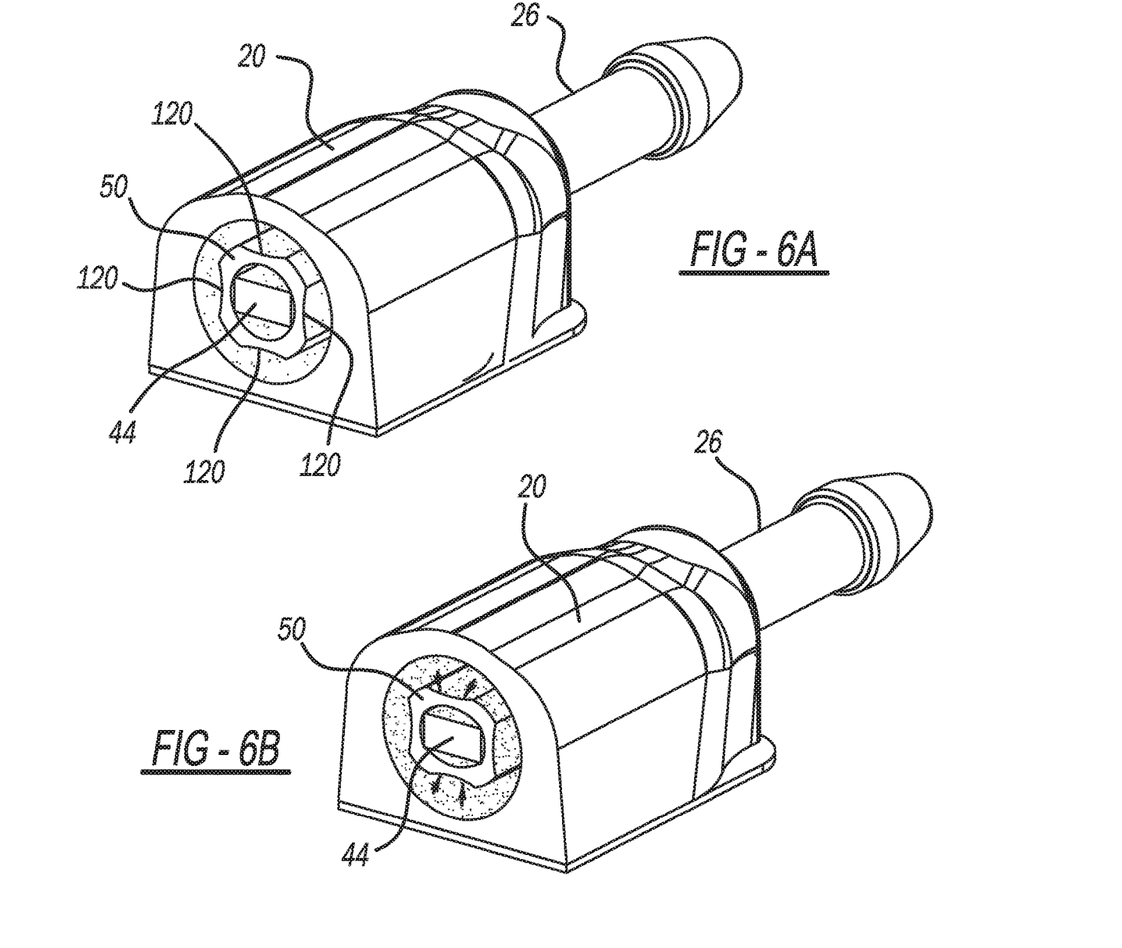
FIG. 6A is a cross-sectional view of the valve assembly taken along line 6A-6A of FIG. 5 with a flexible flow control member in a relaxed position.
FIG. 6B is the same as FIG. 6A, but with the flexible flow control member flexed inward as a result of increased fluid flow through the valve assembly.

As illustrated in FIGS. 5, 6A, and 6B, the support 44 has a generally rectangular cross-section such that a height of the support 44 is less than a width of the support 44. The width of the support 44 generally spans across the inner fluid chamber 90. Thus, the areas of the inner fluid chamber 90 into which fluid may flow are generally on a top and a bottom side of the support 44. At an exterior of the flexible flow control member 50 are concave outer surfaces 120, which are located on the top, bottom, and sides of the flexible flow control member 50. The concave outer surfaces 120 facilitate fluid flow into the inlet openings 56. In the relaxed position, the inner fluid chamber 90 has a generally circular cross-sectional shape (FIG. 6A). When the flexible flow control member 50 flexes inward in response to increased fluid flow as described further herein, the inner fluid chamber 90 becomes oval in cross-section (FIG. 6B).

Figure 8A:
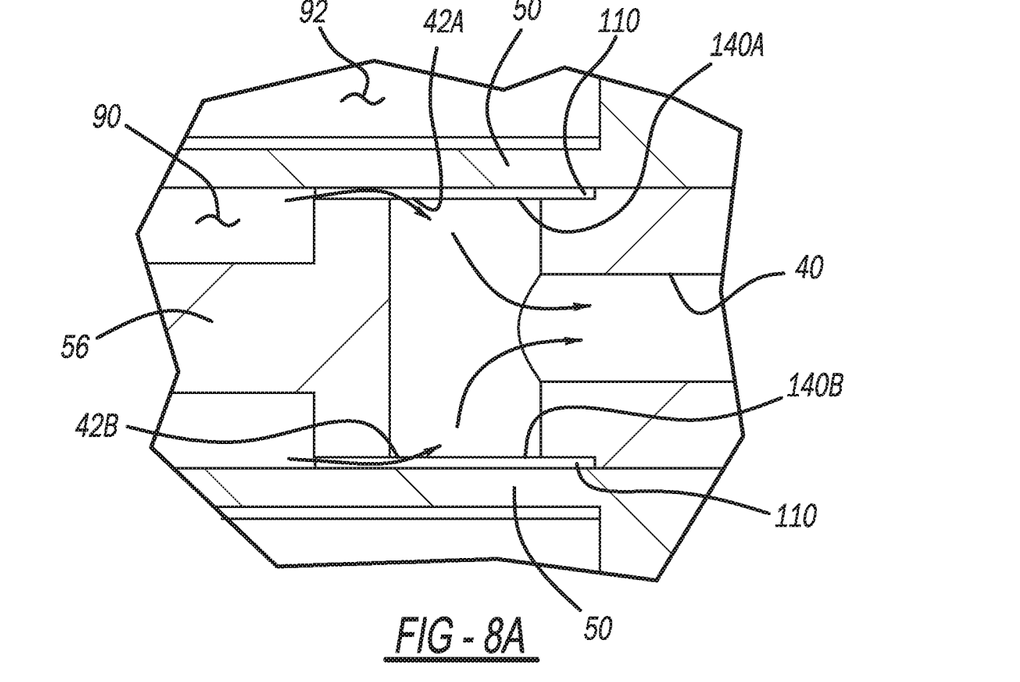
FIG. 8A illustrates area 8A of FIG. 4A in detail.

FIG. 8A illustrates area 8A of FIG. 4A. As illustrated in FIG. 8A, a first slot 140A is defined between the flexible flow control member 50 and the first outlet opening 42A (and portions of the outlet connector 26 defining the first outlet opening 42A). A second slot 140B is defined between the flexible flow control member 50 and the second outlet opening 42B (and portions of the outlet connector 26 defining the second outlet opening 42B). When the flexible flow control member 50 is in the relaxed position of FIG. 8A, fluid from the inner fluid chamber 90 may flow through the first and second slots 140A, 140B and through the first and second outlet openings 42A, 42B into the outlet passageway 40 to exit the valve assembly 10 at a first flow rate.

Figure 8B:
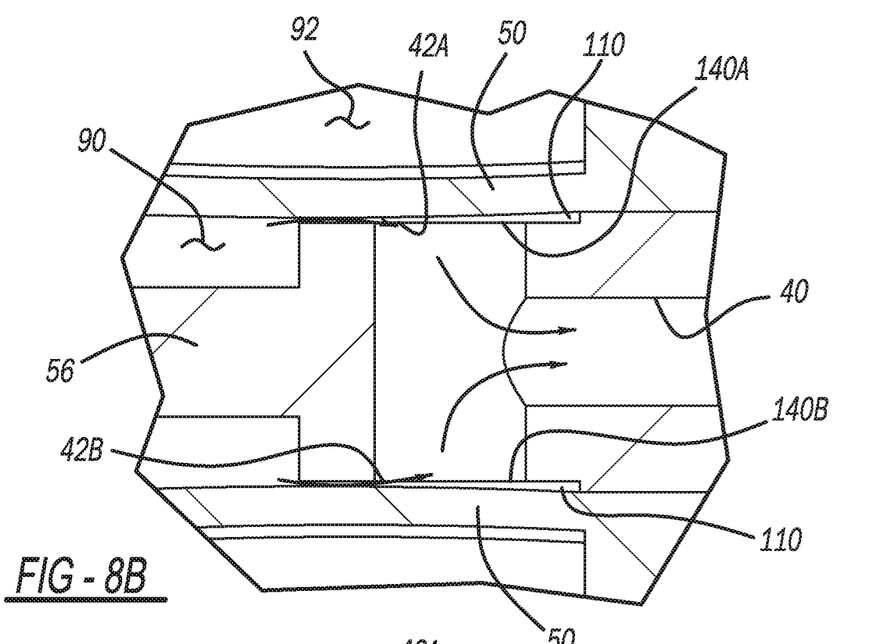
FIG. 8B is similar to FIG. 8A, but with the flexible flow control member flexed inward to reduce the flow rate of fluid through the valve assembly.

When pressure within the outlet passageway 40 drops relative to pressure within the inner fluid chamber 90, a negative static hydraulic pressure state may occur within the outlet passageway 40, which may result in a siphoning effect drawing fluid through the valve assembly 10. With reference to FIG. 8B, during such a negative static hydraulic pressure state, the flexible flow control member 50 is configured to flex inward towards the first and second outlet openings 42A, 42B, thereby reducing the sizes of the first and second slots 140A, 140B and reducing fluid flow through the valve assembly 10 to ensure that the fluid flow exits at a constant rate. In this manner, the flexible flow control member 50 advantageously resists the siphoning effect, which may over-drain fluid through the valve assembly 10. The inwardly flexed configuration of FIG. 8B may occur together with, or independent of, the inwardly flexed configuration of FIG. 4C, which is described further herein.

Figure 9:
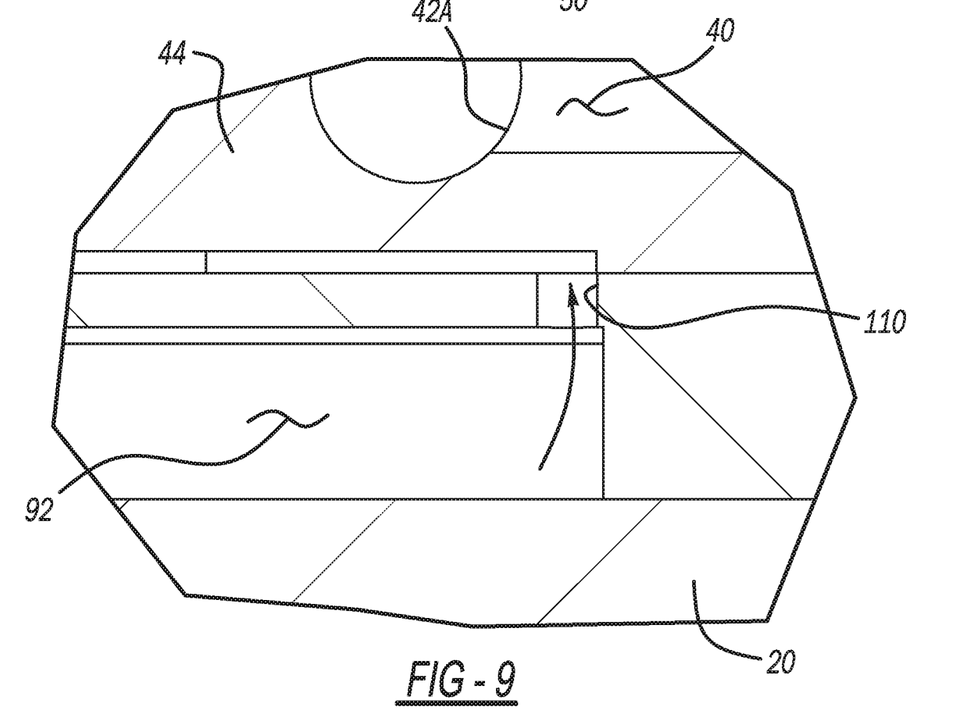
FIG. 9 illustrates area 9 of FIG. 5 in detail.

With particular reference to FIG. 5 and FIG. 9 illustrating area 9 of FIG. 5, leak channels 110 are defined by the flexible flow control member 50. The leak channels 110 provide fluid communication between the outer fluid chamber 92 and the outlet passageway 40. The leak channels 110 allow for a small amount of fluid to flow at a low rate directly from the outer fluid chamber 92 into the outlet passageway 40 without flowing through the inner fluid chamber 90. Fluid flow through the leak channels 110 advantageously reduces pressure in the outer fluid chamber 92 and prevents fluid from being trapped in the outer fluid chamber 92, which may "lock" the flexible flow control member 50 in the inwardly flexed positions of FIG. 4C or FIG. 8A. The leak channels 110 can also reduce the "dead space" in the outer fluid chamber 92, which may otherwise retain fluid and accumulate particles from cerebrospinal fluids inside the intracranial ventricles, (thereby advantageously reducing any possibility of infection during a shunting procedure). In some applications, about 10%-20%, such as about 14%, of fluid flow passes through the leak channels 110 to reduce pressure in the outer fluid chamber 92 by about 80%-90%, such as about 85%, for example. The amount of the pressure drop in the outer fluid chamber 92 depends on, for example, the pressure difference between the outer fluid chamber 92 and the inner fluid chamber 90. The larger the difference, the larger the pressure drive and hence more pressure reduction in the outer fluid chamber 92.

With renewed reference to FIGS. 4B and 4C, fluid from the inlet passageway 48 flows across the check valve 70 and into the outer fluid chamber 92 when the pressure and flow rate of the fluid is sufficient to bend the flexible flap 72. Some fluid remains in the outer fluid chamber 92, and some of the fluid flows through the inlet openings 56 of the flexible flow control member 50 into the inner fluid chamber 90. From the inner fluid chamber 90, fluid flows through the first and second slots 140A, 140B and through the first and second outlet openings 42A, 42B into the outlet passageway 40. From the outlet passageway 40 the fluid exits the valve assembly 10 through the outlet port 28. Some of the fluid of the outer fluid chamber 92 flows through the leak channels 110 into the outlet passageway 40 without flowing through the inner fluid chamber 90.

As fluid flow through the inlet passageway 48 increases, with a larger opening/diameter on inlet opening 56 than the leak channels 110, higher flow rate can be expected inside the inner fluid chamber 90 relative to the outer fluid chamber 92. Thus, more pressure/momentum loss will occur as fluid flows from the inlet opening 56 toward the first and second outlet openings 42A, 42B, which results in a pressure drop within the inner fluid chamber 90 relative to the outer fluid chamber 92.

This pressure differential between the inner and outer fluid chambers 90, 92 causes the flexible flow control member 50 to flex inward and shrink the inner fluid chamber 90, as illustrated in FIG. 4C. The pressure differential is greatest at the portion of the inner fluid chamber 90 proximate to the first and second outlet openings 42A, 42B. As the rate of fluid flow through the inlet passageway 48 decreases, pressure within the inner fluid chamber 90 increases towards, or back to, the same pressure as the outer fluid chamber 92, which moves the flexible flow control member 50 back towards or to the relaxed position of FIG. 4B (or allows the flexible flow control member 50 to flex back towards or to the relaxed position of FIG. 4B, such as when the flexible flow control member 50 is made of any suitable shape-memory material). In this manner, the flexible flow control member 50 regulates fluid flow through the housing 20 to provide constant fluid flow.

For example, as the fluid flow through the inlet passageway 48 increases from 5 cc/hr to 50 cc/hr, the inner fluid chamber 90 experiences an exemplary pressure drop of about 0.056 psi, thus resulting in a pressure differential between the inner and outer fluid chambers 90, 92 of about 0.050 psi. The inner fluid chamber 90 then flexes inward to reduce fluid flow rate therethrough.

The flexing of the flexible flow control member 50 illustrated in FIGS. 4B and 4C may take place independent of, or in conjunction with, the flexing illustrated in FIGS. 8A and 8B reducing the size of the first and second slots 140A, 140B to reduce the siphoning effect resulting from a negative static hydraulic pressure state. Likewise, the flexing illustrated in FIGS. 8A and 8B may occur independent of, or in conjunction with, the flexing of the flexible flow control member 50 illustrated in FIGS. 4B and 4C.

Figure 10:
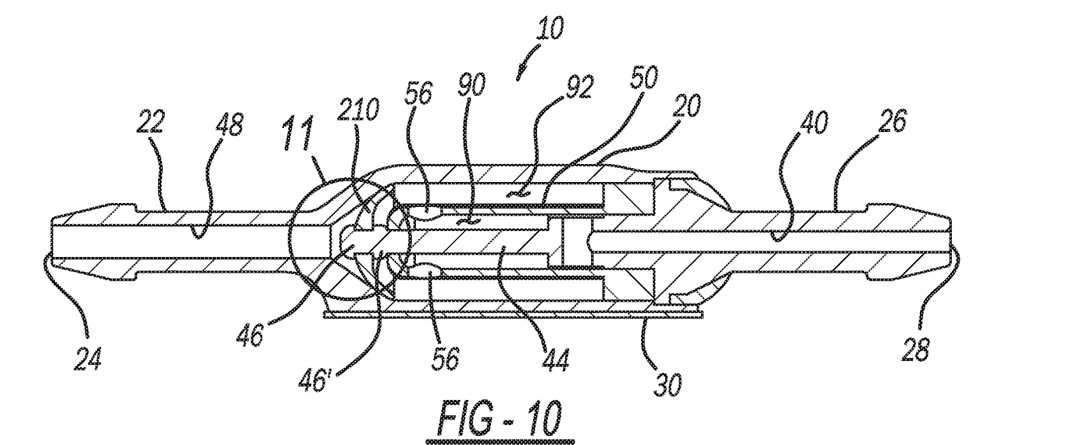
FIG. 10 is a cross-sectional view another valve assembly in accordance with the present disclosure.
Figure 11:
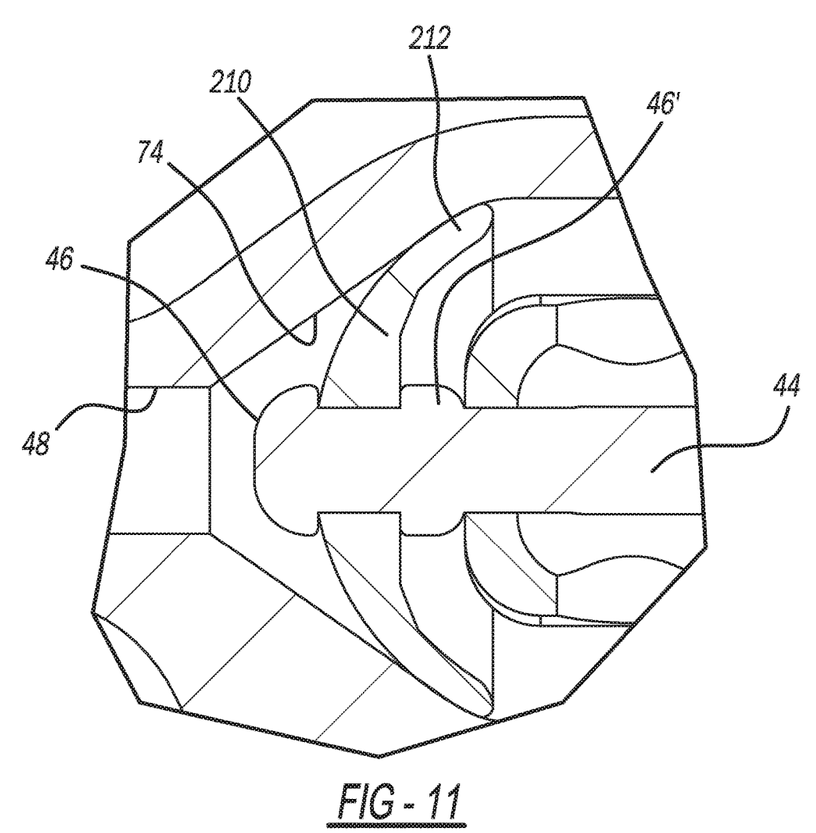
FIG. 11 illustrates area 11 of FIG. 10 in detail.

With reference to FIGS. 10 and 11, the check valve 70 may be replaced with a check valve 210, which is spaced apart from the flexible flow control member 50. The check valve 210 is seated on the support 44 between the knob 46 and an inner knob 46'. Other than being spaced apart from the flexible flow control member 50, the check valve 210 is substantially similar to the check valve 70. For example, the check valve 210 includes a flexible flap 212, which abuts the inner surface 74 of the housing 20 as the flexible flap 72 does. When fluid flow through the inlet passageway 48 exceeds a sufficient pressure and rate, the flow will cause the flap 212 to fold backwards and allow fluid to flow into the outer fluid chamber 92.

Figure 12:
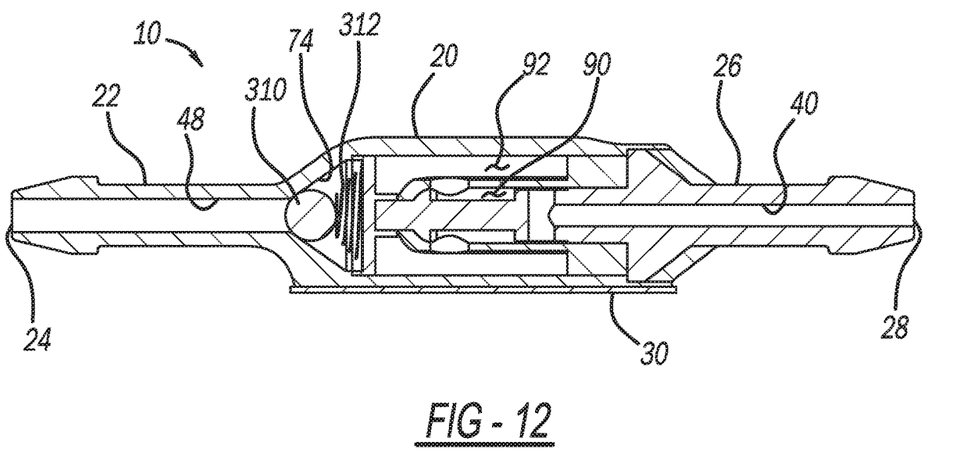
FIG. 12 is a cross-sectional view of yet another valve assembly in accordance with the present disclosure.
Figure 13:
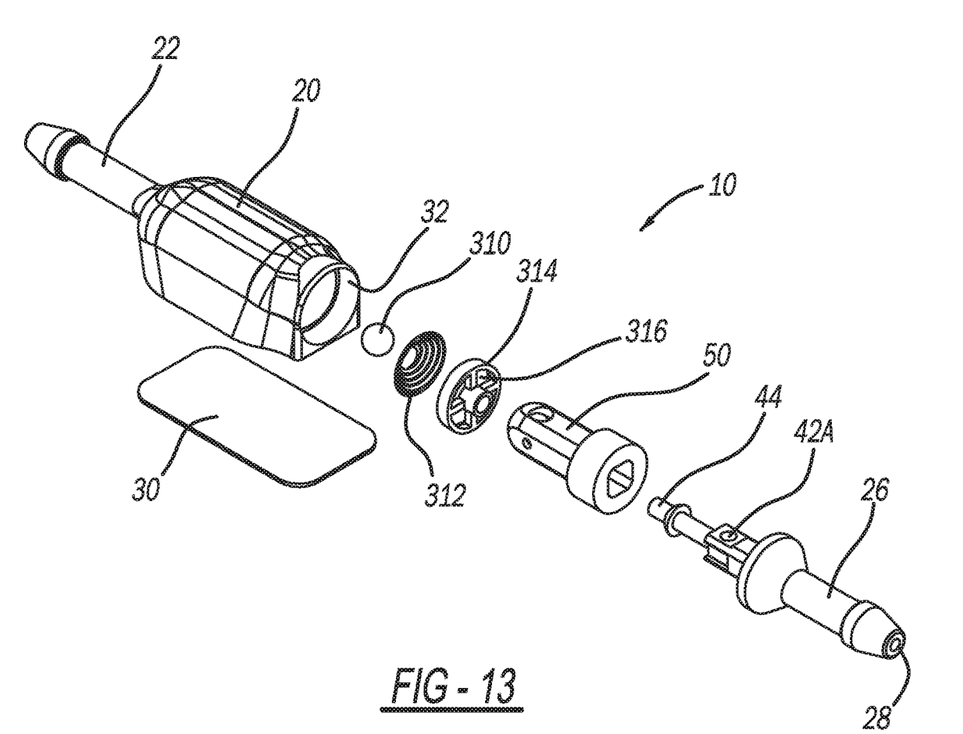
FIG. 13 is an exploded view of the valve assembly of FIG. 12.

FIGS. 12 and 13 illustrate the check valve as a ball and spring valve including a ball 310, a spring 312, and a spring seat 314. The spring seat 314 defines passageways 316 for the flow of fluid therethrough. The spring seat 314 is supported by the support 44. The spring 312 is configured such that when fluid flow through the inlet passageway 48 increases above a particular rate and pressure, the spring 312 will compress. As the spring 312 compresses, the ball 310 moves inward and away from the inner surface 74, thereby allowing fluid to flow through the spring seat 314 and into the outer fluid chamber 92.

The present disclosure thus advantageously provides for the valve assembly 10, which regulates fluid, such as CSF, by providing a generally constant flow rate through the valve assembly 10 regardless of pressure throughout the system, such as changes in intracranial pressure. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A valve assembly configured to control flow of fluid therethrough, the valve assembly comprising:
 a housing, an inlet passageway through which fluid enters the housing at an inlet flow rate, and an outlet passageway through which fluid exits the housing at an outlet flow rate;
 a flexible flow control member within the housing, the flexible flow control member defining an inner fluid chamber within the flexible flow control member and an inlet opening to the inner fluid chamber, the inlet passageway and the outlet passageway are in fluid communication with the inner fluid chamber; and
 an outer fluid chamber defined between the flexible flow control member and an inner surface of the housing;
 wherein the valve assembly is configured such that fluid flows into the outer fluid chamber from the inlet passageway, from the outer fluid chamber into the inner fluid chamber through the inlet opening defined by the flexible flow control member, and out of the inner fluid chamber through the outlet passageway; and
 wherein the flexible flow control member is configured to flex inward and shrink the inner fluid chamber in response to a pressure decrease in the inner fluid chamber relative to the outer fluid chamber resulting from an increase in the inlet flow rate to maintain the outlet flow rate at a constant rate.

2. The valve assembly of claim 1, wherein the flexible flow control member is seated on a support defining an outlet opening to the outlet passageway, and a slot for fluid flow out of the inner fluid chamber into the outlet passageway is defined between the outlet opening and the flexible flow control member.

3. The valve assembly of claim 2, wherein in response to an increase in negative static hydraulic pressure within the outlet passageway relative to pressure of the inner fluid chamber, the flexible flow control member is configured to flex towards the outlet opening to reduce fluid flow out of the inner fluid chamber to maintain the outlet flow rate at a constant rate.

4. The valve assembly of claim 1, further comprising a check valve at an upstream end of the housing relative to fluid flow therethrough, the check valve is configured to allow fluid flow into the outer fluid chamber from the inlet passageway and restrict fluid flow out of the outer fluid chamber into the inlet passageway.

5. The valve assembly of claim 4, wherein the check valve includes a flexible flap integral with the flexible flow member or spaced apart from the flexible flow member on a support that supports the flexible flow member.

6. The valve assembly of claim 4, wherein the check valve is a ball valve.

7. The valve assembly of claim 1, wherein the flexible flow control member has a circular cross-section in a relaxed configuration, and is configured to flex to an oval cross-section in response to the pressure decrease in the inner fluid chamber relative to the outer fluid chamber.

8. The valve assembly of claim 1, further comprising a leak channel defined by the flexible flow control member providing fluid communication between the outer fluid chamber and the outlet passageway at a downstream end of the outer fluid chamber to relieve pressure from within the outer fluid chamber.

9. The valve assembly of claim 1, further comprising a base sheet secured to an undersurface of the housing and configured to support the housing on a surface of a user's anatomy.

10. A valve assembly configured to be arranged on a user to provide a constant flow rate of a fluid through the valve assembly into or out of the user, the valve assembly comprising:
 a housing;
 an inlet connector extending from an upstream end of the housing, the inlet connector configured to connect to a first conduit delivering the fluid into the housing at an inlet flow rate;
 an outlet connector extending from a downstream end of the housing, the outlet connector configured to connect to a second conduit carrying the fluid away from the housing at an outlet flow rate;
 a flexible flow control member within the housing, the flexible flow control member defining an inner fluid chamber within the flexible flow control member and an inlet opening to the inner fluid chamber;
 a support within the housing to which the flexible flow control member is mounted, the support defining an outlet opening to the outlet passageway, the outlet opening is within the inner fluid chamber;
 an outer fluid chamber defined between the flexible flow control member and an inner surface of the housing;
 a check valve at an upstream end of the housing configured to allow flow of the fluid from the inlet connector into the outer fluid chamber and restrict flow of the fluid from the outer fluid chamber back into the inlet connector;
 wherein the valve assembly is configured such that from the outer fluid chamber the fluid flows into the inner fluid chamber through the inlet opening defined by the flexible flow control member, and out of the inner fluid chamber through the outlet opening and the outlet passageway; and
 wherein in response to an increase in negative static hydraulic pressure within the outlet passageway the flexible flow control member is configured to flex towards the outlet opening to reduce flow of the fluid through the outlet opening and maintain the outlet flow rate at the constant flow rate.

11. The valve assembly of claim 10, wherein a slot for flow of the fluid out of the inner fluid chamber and into the outlet passageway is defined between the outlet opening and the flexible flow control member; and
 wherein in response to the increase in negative static hydraulic pressure, the flexible flow control member is configured to flex inward to make the slot smaller and reduce the outlet flow rate.

12. The valve assembly of claim 11, wherein in response to a pressure drop within the inner fluid chamber relative to the outer fluid chamber resulting from an increase in the inlet flow rate of the fluid into the housing, the flexible flow control member is configured to flex inward and shrink the inner fluid chamber to provide the constant flow rate of the fluid through the valve assembly.

13. The valve assembly of claim 10, wherein the check valve includes a flexible flap integral with the flexible flow control member or spaced apart from the flexible flow control member on the support.

14. The valve assembly of claim 10, wherein the check valve is a ball valve.

15. The valve assembly of claim 10, wherein the support extends through the inner fluid chamber and has a rectangular cross-section within the inner fluid chamber; and
 wherein in response to the pressure drop within the inner fluid chamber the inner fluid chamber transitions from circular to oval in cross-section.

16. The valve assembly of claim 10, further comprising a leak channel defined by the flexible flow control member, the leak channel is an opening providing fluid communication between the outer fluid chamber and the outlet passageway at a downstream end of the outer fluid chamber to relieve pressure from within the outer fluid chamber.

17. The valve assembly of claim 10, further comprising a base sheet secured to an undersurface of the housing and configured to support the housing on a surface of the user's anatomy.

18. The valve assembly of claim 10, wherein the support is connected to the outlet connector.

19. A method for using a valve assembly to provide a constant flow rate of fluid through the valve assembly into or out of a user, the method comprising:
  connecting an inlet connector extending from an upstream end of a housing to a first conduit delivering the fluid into the housing at an inlet flow rate;
  connecting an outlet connector extending from a downstream end of the housing to a second conduit transporting the fluid out of the housing at an outlet flow rate; and
  arranging the valve assembly relative to the user;
  wherein the valve assembly is configured such that the fluid flowing into the housing through the inlet connector flows into an outer fluid chamber surrounding a flexible flow control member, into an inner fluid chamber defined by the flexible control member through an inlet opening defined by the flexible flow control member, and out of the inner fluid chamber through an outlet opening and the outlet connector; and
  wherein in response to a reduction of inner pressure within the inner fluid chamber relative to the outer fluid chamber of the valve assembly resulting from an increase in the inlet flow rate of the fluid into the housing, the flexible flow control member is configured to flex inward and shrink the inner fluid chamber to provide the constant flow rate of the fluid through the valve assembly.

20. The method of claim 19, further comprising connecting the first conduit to a fluid source of the user to be drained.

\* \* \* \* \*